Sept. 20, 1927.  
R. STRESAU  
1,643,227  
METHOD OF METALLIC ARC WELDING  
Filed Nov. 24, 1924
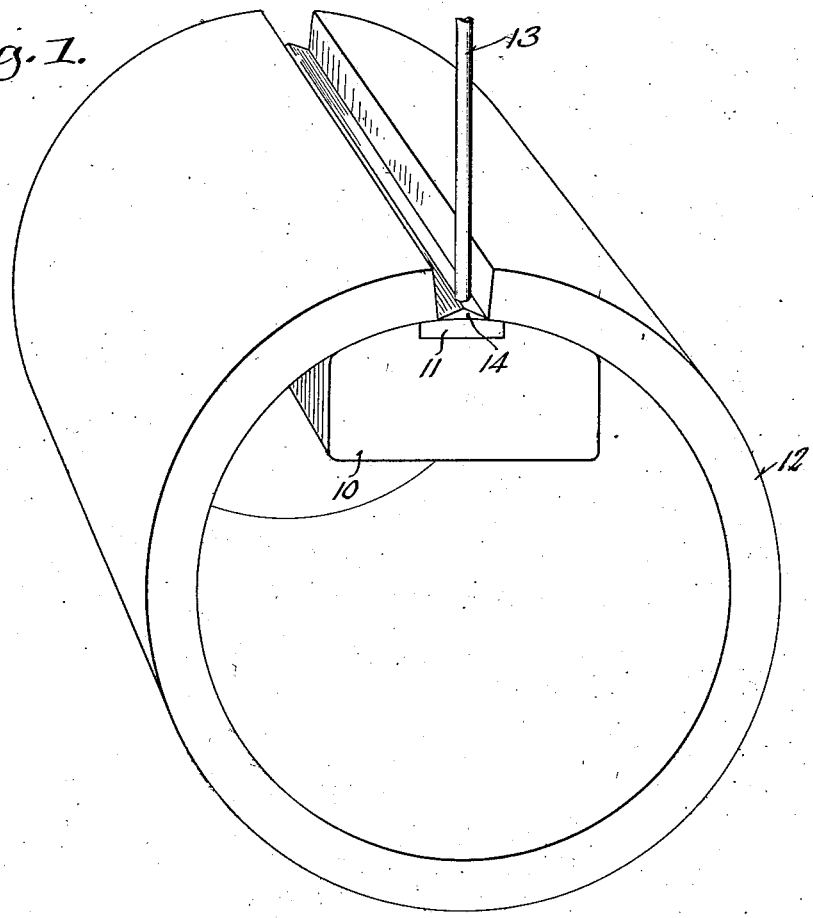
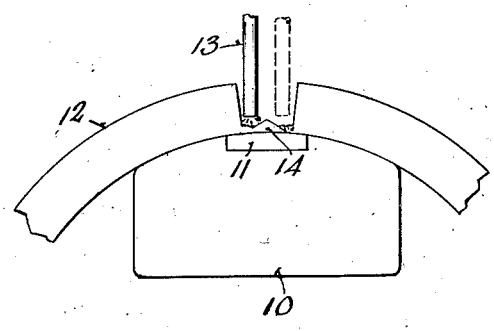
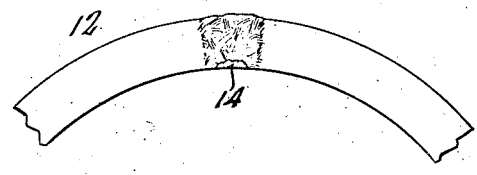

Patented Sept. 20, 1927.

1,643,227

UNITED STATES PATENT OFFICE.

RICHARD STRESAU, OF WAUWATOSA, WISCONSIN, ASSIGNOR TO A. O. SMITH CORPORATION, OF MILWAUKEE, WISCONSIN, A CORPORATION OF NEW YORK.

METHOD OF METALLIC ARC WELDING.

Application filed November 24, 1924. Serial No. 752,027.

The present invention relates to an improvement in the art of metallic arc welding, and it is particularly applicable to the production of pipe couplings of large diameter, which ordinarily are constructed of metal plates of excessive thickness. In forming such pipe couplings by electric welding, it is expedient, from the manufacturing standpoint, to take a thick metal plate of a length which will enable it to be bent or rolled into annular form with its ends in proximity so as to produce a coupling of the desired diameter. The joining of the meeting ends of the thick plate by electric welding, so as to produce an integral structure in which the welded joint may be depended upon to possess a degree of strength which at least is as great as that of the material of the coupling in which the joint is formed, is attended with some difficulty. I have made many experiments along this line in attempts to solve the problems involved, and have found that the most satisfactory method of forming the welded joint is to first form a welding groove in the line of the meeting ends of the plate so as to effect a reduction in the thickness of that portion of the metal which lies at the bottom of the groove, whereby the depth of penetration by the heat is lessened, and so that complete fusion in the lowermost stratum of the metal may take place. I thus form the foundation for the building up of the uniformly welded joint by the application of successive layers of fused welding material.

Instead of scarfing or chamfering the edges of the plate at their meeting ends according to the usual practice of forming the welding groove, I roll the strip into annular form as before, but with the ends thereof a substantial distance apart, leaving an open gap, the dimensions of which will be determined by the size of the coupling and the thickness of the plate from which it is formed. In the welding channel thus formed I place a thin welding strip, the width of which approximates that of the channel, the base or lower side of the strip being flush with the inner surface of the coupling, and the edges of the strip abutting the side walls of the channel. Excellent results have been achieved by the use of a strip which is triangular in cross section, such a construction presenting a strip having the necessary thin abutting edges with a central ridge at its upper side, which latter feature of construction will serve to prevent warping of the strip by the heat when the electric arc is applied thereto. The arc is caused to play in the angles formed at the bottom of the channel by the junction of the sides of the welding strip and the ends of the metal plate from which the coupling is formed. Upon the application of the arc, the thin edges of the metal strip and the metal in the side walls of the channel are fused by the arc in such a degree that the somewhat ephemeral welding strip and the coupling blank are united into an integral structure by amalgamation of the metals.

The welding current is conducted by means of a fusible weldrod, which is fed to the work in the ratio of the consumption thereof, the molten metal flowing from the weldrod being deposited in the welding channel, and being incorporated in the joint. The weldrod is vibrated from side to side in the welding channel, so that the arc will play across the welding strip and upon both of the meeting ends of the blank by which the channel is formed. The operation is continued until the channel has been filled and the contour of the coupling is completed. Additional welding metal in the form of slugs may be placed in the channel, to be fused by the electric arc, and thus hasten completion of the work.

The details of my invention will be hereinafter particularly described, and the novelty thereof will be pointed out in the appended claims.

In the accompanying drawing:

Figure 1 is a perspective view of a pipe coupling arranged for the commencement of the welding operation.

Fig. 2 is a fragmentary view in elevation of one end thereof, and indicating the lateral vibration of the weldrod across the welding strip.

Fig. 3 is a like fragmentary view showing the completely welded joint.

In the drawing, the numeral 10 indicates a mandrel or chill, curved across its upper surface to the radius of the bore of the coupling, and recessed longitudinally upon such curved surface so as to receive and retain during the welding operation a backing strip 11. The coupling blank is indicated 12 and is drawn into the annular shape shown from a thick metal plate, the meeting ends of which are cut square, such ends being spaced apart a suitable distance to provide a gap constituting the welding channel, the latter being entered by the free end of the weldrod 13, which conducts the welding current, and at the point of which the metallic arc is formed. When rolled into annular shape, the squared ends of the plate form the vertical walls of the channel, such walls being substantially parallel with each other.

The coupling blank 12 is placed upon the mandrel, and a reducible welding strip 14 is then arranged in the channel, the said strip 14 resting at its base upon the backing strip 11 carried by the mandrel. The width of the welding strip 14 should be such as to cause its said edges to contact with the side walls of the channel and form a temporary bottom therefor. As hereinbefore stated, the strip 14 is produced with thin edges or sides and is conveniently and preferably formed as a triangle, the apex of which is low, thereby forming a rib which will impart rigidity to the strip and obviate liability to warping or displacement under the heat of the electric arc during the welding operation.

The arc plays in the angles formed by the edges of the welding strip and the adjacent walls of the channel, and by lateral vibration of the weldrod the arc is caused to cross from side to side over the welding strip so as to fuse the metals in and adjacent the paths of its movement. In addition, there is a relative traverse of the weldrod and the work longitudinally of the latter, so that complete fusion is effected throughout the length of the coupling. The fusion of the welding strip and the adjacent walls of the channel is supplemented by the fusion of the weldrod, so that a layer of metal, to which the weldrod contributes a portion, is formed with each longitudinal traverse of the weldrod. This action is repeated, so that by successive layers the channel is filled and the contour of the coupling restored. To lessen weldrod consumption and hasten the welding operation, additional welding material in the form of slugs or strips may be placed in the channel for fusion by the arc.

While I have shown the welding strip as of triangular cross section, it is obvious that welding strips of other cross sections may be used, the essential feature being the arrangement of a thin edged convertible welding strip in the gap or channel of the coupling so as to permit the arc to play in the angle and effect ready and complete fusion by the arc of the metals in the lines of their contact. By the last term I mean that the welding action shall extend through to the bottom of the work at the angles. It is also desirable that the said strip be provided upon its upper face with a rigidifying rib, for the purpose described, but in whatever may be its form, the strip should have thin edges to permit penetration of the fusing current, and a central portion presenting sufficient metal to resist destruction of the strip in the fusing action.

I have found the use of an impermanent backing strip 11 in connection with the mandrel to be a desirable expedient, inasmuch as the fusion of the edges of the welding strip may be to such an extent that the backing strip will be caused to adhere to the coupling. Without such backing strip, the coupling would sometimes be welded to the mandrel, and difficulties would be encountered in effecting its detachment. The provision of the backing strip and its use in the manner described eliminates this objectionable condition and simplifies the operations performed in handling and treating the coupling.

If, at the completion of the welding operation, the backing strip be found to have adhered to the coupling, such strip may be easily chipped off. Surplus metal deposited upon the exterior surface of the coupling in the welding operation may likewise be removed so as to restore the symmetry of the coupling.

The process herein disclosed is applicable to the production of welded joints between the ends of thick metal plates in their flat state, as well as in the curved form shown, and such an application I regard as within the scope of the appended claims, inasmuch as the parts to be welded are always arranged in the same plane, be it curved or straight.

Having thus described my invention, what I claim and desire to secure by Letters Patent of the United States, is:

1. The method of arc welding which comprises the formation of a thick metal plate into an annulus with the ends of the plate meeting in the same plane and spaced to form a welding channel, inserting a thin strip of welding metal and flush with the inner wall of the annulus to close the bottom of the said channel, and fusing the thin metal strip and the side walls of the channel into an integral structure by an electric arc.

2. The method of arc welding which comprises the formation of a thick metal plate into an annulus with the ends of the plate meeting in the same plane and spaced to form a welding channel, inserting a thin strip of welding metal and flush with the inner wall of the annulus to close the bottom of the said channel, conducting an arcing current by a fusible weldrod to fuse the thin metal strip and the side walls of the channel, and filling the channel with welding metal flowing from the weldrod to form an integral structure.

3. The method of arc welding which comprises the formation of a thick metal plate into an annulus with the ends of the plate meeting in the same plane and spaced to form a welding channel, inserting a strip of welding metal provided with a rigidifying rib in the channel at the bottom thereof and flush with the inner wall of the annulus to close the same, and fusing the said metal strip and the side walls of the channel into an integral structure by an electric arc.

4. The method of arc welding which comprises the formation of a thick metal plate into an annulus with the ends of the plate meeting in the same plane and spaced to form a welding channel, inserting a strip of welding metal of triangular cross section with its base at the bottom of the channel and flush with the inner wall of the annulus, and fusing the said metal strip and the side walls of the channel into an integral structure by an electric arc.

5. The method of arc welding which comprises the formation of a thick metal plate into an annulus with the ends of the plate meeting in the same plane and spaced to form a welding channel, inserting a strip of welding metal provided with a rigidifying rib in the channel at the bottom thereof and flush with the inner wall of the annulus to close the same, conducting an arcing current by a fusible weldrod, and vibrating the arc across the said metal strip to fuse the latter and the side walls of the channel to form an integral structure.

6. The method of arc welding which comprises the formation of a thick metal plate into an annulus with the ends of the plate meeting in the same plane and spaced to form a welding channel, arranging the annulus upon a mandrel with a temporary backing strip under the channel, inserting a thin edged strip of welding metal in the bottom of the channel with its base upon the backing strip and flush with the inner wall of the annulus, and fusing the welding strip and the side walls of the channel into an integral structure by an electric arc.

7. The method of arc welding which comprises the formation of a thick metal plate into an annulus with the ends of the plate meeting in the same plane and spaced to form a welding channel, arranging the annulus upon a mandrel with a temporary backing strip under the channel, inserting a thin edged strip of welding metal in the bottom of the channel with its base upon the backing strip and flush with the inner wall of the annulus, fusing the welding strip and the side walls of the channel by a current conducted by a fusible weldrod, and filling the channel with welding metal flowing from the weldrod to form an integral structure.

8. The method of arc welding which consists in the formation of a thick metal plate into an annulus with the ends of the plate meeting in the same plane and separated to form the walls of a welding channel, inserting a thin edged strip of welding material in the bottom of the channel and flush with the inner wall of the annulus, conducting an arcing current by means of a fusible weldrod, vibrating the weldrod across the welding strip to unite the edges thereof to the side walls of the channel, and traversing the weldrod longitudinally of the channel to fill the same with welding metal flowing from the weldrod.

9. The method of arc welding which consists in the formation of a thick metal plate with squared ends into an annulus in which such ends meet in the same plane and stand separated to form a welding channel with substantially vertical side walls, inserting a triangular metal strip at the bottom of the said channel to lie flush with and close the latter, conducting an arcing current into the channel by means of a fusible weldrod, vibrating the weldrod across the channel to fuse the welding strip and the side walls of the channel into a weld, and traversing the weldrod longitudinally of the channel to fill the same with welding material flowing from the weldrod and complete the welded joint.

10. The method of arc welding which consists in arranging thick metal plate edges in the same plane and spaced apart to constitute a welding channel, inserting a thin edged strip at the bottom of the channel to lie flush with and close the latter, and fusing the said strip and plate edges forming the channel into an integral structure by an electric arc.

11. The method of arc welding which consists in arranging squared thick metal plate edges in the same plane so as to form a welding channel having substantially vertical side walls, inserting a thin edged metal strip at the bottom of the channel to lie flush with and close the latter, and fusing the said strip and the plate edges forming the channel into an integral structure by an electric arc.

12. The method of arc welding which consists in arranging squared thick metal plate edges in the same plane so as to form a welding channel having substantially vertical side walls, inserting a thin edged metal strip at the bottom of the channel to lie flush with and close the latter, conducting a welding current by means of a fusible weldrod, and fusing the said strip and the plate edges forming the channel into an integral structure by an electric arc.

13. The method of arc welding which consists in arranging squared thick metal plate edges in the same plane so as to form a welding channel having substantially vertical side walls, inserting a thin edged metal strip at the bottom of the channel to lie flush with and close the latter, conducting a welding current by means of a fusible weldrod, fusing the said strip and the plate edges forming the channel into an integral structure by an electric arc, and filling the channel with additional welding metal flowing from the fusible weldrod.

In testimony whereof, I have signed my name at Milwaukee, this 21st day of November, 1924.

R. STRESAU.